US012722146B2

(12) United States Patent
Kabes et al.

(10) Patent No.: US 12,722,146 B2
(45) Date of Patent: Sep. 1, 2026

(54) COBALT CATALYSTS CONTAINING "SMART" OR "TASK SPECIFIC" ANIONS

(71) Applicant: The Texas A&M University System, College Station, TX (US)

(72) Inventors: Connor Q. Kabes, San Antonio, TX (US); William J. Maximuck, Pennsburg, PA (US); John A. Gladysz, College Station, TX (US); Aaron R. Wegener, Broomfield, CO (US)

(73) Assignee: The Texas A&M University System, College Station, TX (US)

( * ) Notice: Subject to any disclaimer, the term of this patent is extended or adjusted under 35 U.S.C. 154(b) by 447 days.

(21) Appl. No.: 18/566,475

(22) PCT Filed: Jun. 2, 2022

(86) PCT No.: PCT/US2022/031958
§ 371 (c)(1),
(2) Date: Dec. 1, 2023

(87) PCT Pub. No.: WO2022/256525
PCT Pub. Date: Dec. 8, 2022

(65) Prior Publication Data

US 2024/0261770 A1 Aug. 8, 2024

Related U.S. Application Data

(60) Provisional application No. 63/196,383, filed on Jun. 3, 2021.

(51) Int. Cl.
*B01J 31/18* (2006.01)

(52) U.S. Cl.
CPC .......... *B01J 31/182* (2013.01); *B01J 2231/12* (2013.01); *B01J 2531/845* (2013.01)

(58) Field of Classification Search
CPC ..... C07F 15/065; B01J 31/182; B01J 2331/12
See application file for complete search history.

(56) References Cited

U.S. PATENT DOCUMENTS

| | | | |
|---|---|---|---|
| 2015/0165429 | A1 | 6/2015 | Lewis et al. |
| 2017/0044198 | A1 | 2/2017 | Lewis |
| 2019/0359641 | A1 | 11/2019 | Gladysz et al. |

OTHER PUBLICATIONS

Maximuck. "Lipophilic chiral cobalt (III) complexes of hexaamine ligands: Efficacies as enantioselective hydrogen bond donor catalysts" 1-8. Molecular Catalysis. .May 21, 2019.

(Continued)

*Primary Examiner* — Richard M Rump
(74) *Attorney, Agent, or Firm* — Jackson Walker LLP

(57) ABSTRACT

In an embodiment, the present disclosure pertains to a composition having a cation and an anion. In some embodiments, a base is incorporated into the anion, and the cation and the anion form a bifunctional catalyst. In some embodiments, the cation is a chiral cobalt(III) species, and a nitrogenous Brpnsted base is incorporated into counter anions of the chiral cobalt(III) species cation. In some embodiments, the bifunctional catalyst is a tricationic cobalt (III) hydrogen bond donor catalyst, and a nitrogenous Brpnsted base is incorporated into counter anions of the tricationic cobalt(III) hydrogen bond donor catalyst. In another aspect, the present disclosure pertains to a bifunctional catalyst having a smart anion with a cationic metal species. In some embodiments, the smart anion performs a specific role in a chemical reaction without the inclusion of additional external components to accomplish a same specific role in the chemical reaction.

7 Claims, 12 Drawing Sheets

(56) References Cited

OTHER PUBLICATIONS

Kabes. "Chiral Tricationic Tris(1,2-diphenylethylenediamine) Cobalt(III) Hydrogen Bond Donor Catalysts with Defined Carbon/Metal Configurations; Matched/Mismatched Effects upon Enantioselectivities with Enantiomeric Chiral Counter Anions" 3249-3263. ACS Catalysis. Web. Feb. 6, 2020.

Xue. "Designing a Bifunctional Bronsted Acid-Base Heterogeneous Catalyst Through Precise Installation of Ligands on Metal-Organic Frameworks" 616-622. CCS Chemistry. Web. Dec. 16, 2019.

TAKEMOTO'S CATALYST $\Lambda$-$[Co(en)_3]^{3+}$ $3X^-$ = $\Lambda$-$\mathbf{1}^{3+}$ $3X^-$ $\Lambda$-$[Co((S,S)\text{-dpen})_3]^{3+}$ $2X^-X'^-$ = $\Lambda$-$(S,S)$-$\mathbf{2}^{3+}$ $2X^-X'^-$ $\Lambda$-$[Co(en)_2en']^{3+}$ $3BAr_f^-$ = $\Lambda$-$(S)$-$\mathbf{3}^{3+}$ $3BAr_f^-$

I $\Lambda$-(*S*,*S*)-2$^{3+}$ (:N--EO$_x^-$)$_n$(X$^-$)$_{3-n}$

E/*x* = C/2, S/3, etc.

II $\Lambda$-(*S*,*S*)-2$^{3+}$ 2Cl$^-$ BAr$_f^-$

DOMINANT HYDROGEN BONDING MOTIF

TRADITIONAL MONOFUNCTIONAL CATALYST COMPONENTS

CATIONIC CATALYST AND NITROGENOUS BASE ARE SEPARATE ENTITIES

*-OFTEN INFERIOR TO BIFUNCTIONAL CATALYSTS*

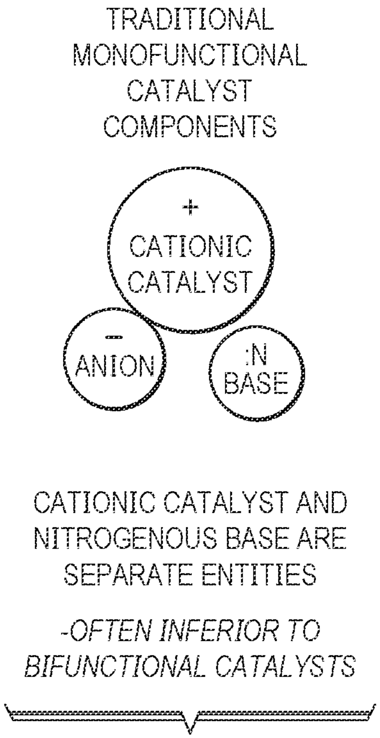

FIG. 3A

BIFUNCTIONAL CATALYSTS WITH FUNCTIONALITY BUILT INTO THE CATION

CATIONIC CATALYST AND NITROGENOUS BASE ARE LINKED COVALENTLY

*-EXTRA SYNTHETIC STEPS;*
*-POSSIBLE FORMATION OF ISOMERS THAT MUST BE SEPARATED*

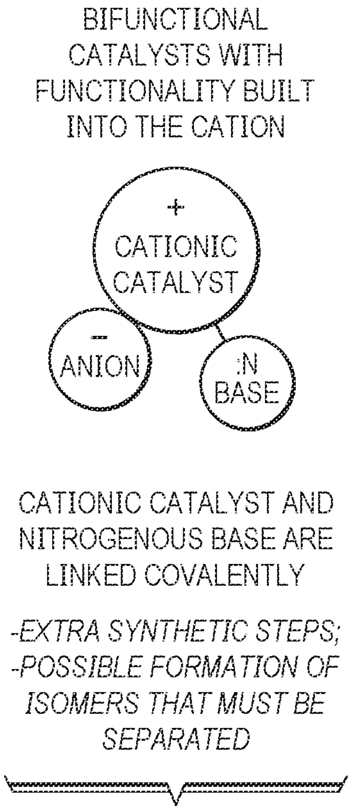

FIG. 3B

NEW BIFUNCTIONAL CATALYST DESIGN, WITH FUNCTIONALITY BUILT INTO THE ANION

CATIONIC CATALYST AND NITROGENOUS BASE ARE LINKED IONICALLY

*-MANY SUCH ANIONS COMMERCIALLY AVAILABLE;*
*-CAN BE APPLIED ON A "DROP-IN" BASIS*

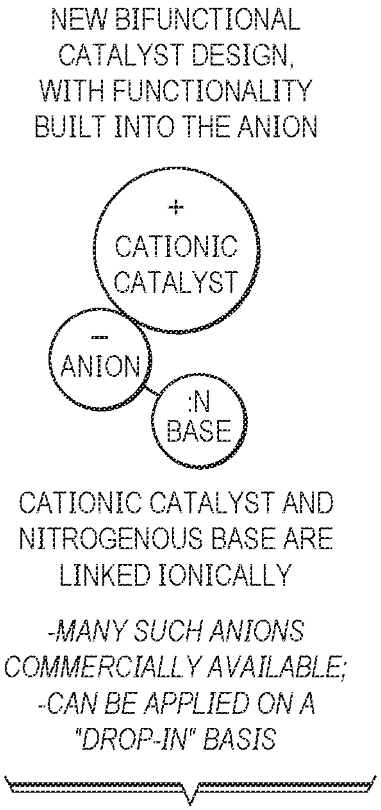

FIG. 3C

| R | |
|---|---|
| H | $4b^-$ |
| Cl | $4f^-$ |
| Me | $4h^-$ |
| $NH_2$ | $4i^-$ |

$4a^-$ $4c^-$ $4e^-$ $4g^-$ $4d^-$ 5a 6a 7a 9a 8 10a 5a 6a 7a 6a-n

5a 7a-n
(DOMINANT CONFIGURATION)

ARYL GROUPS[a]

7a, 95%
86% ee (*R*)

7b, 90%
84% ee (*R*)

7c, 95%
90% ee (*R*)

7d, 99%
71% ee (*R*)

7e, 85%
76% ee (*R*)[b]

7f, 90%
97% ee (*R*)

7g, 73%
67% ee (*R*)

7h, 99%
91% ee (*R*)

7i, 82%
91% ee (*R*)

7j, 99%
91% ee (*R*)

7k, 95%
91% ee (*R*)[c]

7l, 99%
87% ee (*R*)[b]

7m, 74%
82% ee (*R*)[b]

7n, 87%
84% ee (*S*)[c]

PRODUCT[a]

10a, 99%
82% ee (*R*)

10b, 91%
81% ee (*R*)

10c, 99%
81% ee (*S*)[b]

10d, 95%
79% ee (*R*)

10e, 92%
86% ee (*S*)

10f, 90%
51% ee (*R*)

ARYL ANIONS

6a, 73%, 76% ee (*R*)

6b, 48%, 60% ee (*R*)
[61%, 70% ee (*R*)]

6c, 99%, 79% ee (*R*)
[61%, 70% ee (*R*)]

6d, 93%, 82% ee (*R*)

6e, 73%, 76% ee (*R*)

6f, 12%, 77% ee (*R*)

6g, 95%, 68% ee (*R*)
[76%, 70% ee (*R*)]

ARYL ANIONS

6h, 28%, 79% ee (*R*)
[40%, 85% ee (*R*)]

6i, 49%, 84% ee (*R*)
[43%, 74% ee (*R*)]

6j, 54%, 81% ee (*R*)
[81%, 78% ee (*R*)]

6l, 28%, 79% ee (*R*)

6m, 63% 81% ee (*R*)
[91%, 72% ee (*R*)]

6o, 92%, 84% ee (*R*)
[80%, 87% ee (*R*)]

6p, 73%, 76% ee (*R*)
[90%, 85% ee (*R*)]

6q, 96%, 78% ee (*R*)
[83%, 87% ee (*R*)]

6t, 28%, 79% ee (*R*)

6x, 28%, 79% ee (*R*)

6y, 28%, 79% ee (*R*)

COBALT CATALYSTS CONTAINING "SMART" OR "TASK SPECIFIC" ANIONS

CROSS-REFERENCE TO RELATED APPLICATIONS

This patent application claims priority from, and incorporates by reference the entire disclosure of, U.S. Provisional Application 63/196,383 filed on Jun. 3, 2021.

TECHNICAL FIELD

The present disclosure relates generally to cobalt catalysts and more particularly, but not by way of limitation, to cobalt catalysts containing "smart" or "task specific" anions.

BACKGROUND

This section provides background information to facilitate a better understanding of the various aspects of the disclosure. It should be understood that the statements in this section of this document are to be read in this light, and not as admissions of prior art.

For many organic reactions, both a catalyst and a base are required. These can sometimes be combined to give a "bifunctional catalyst" that is much more effective. For reactions catalyzed by salts, the base is traditionally covalently tethered to the cation, but these adducts often require lengthy syntheses and/or afford mixtures of stereoisomers.

The development of this invention was funded in part by the Welch Foundation under grant number A-1656.

SUMMARY OF THE INVENTION

This summary is provided to introduce a selection of concepts that are further described below in the Detailed Description. This summary is not intended to identify key or essential features of the claimed subject matter, nor is it to be used as an aid in limiting the scope of the claimed subject matter.

In an embodiment, the present disclosure pertains to a composition having a cation and an anion. In some embodiments, a base is incorporated into the anion, and the cation and the anion form a bifunctional catalyst.

In some embodiments, the cation is a cationic metal species. In some embodiments, the cationic metal species can include, without limitation, a cobalt species cation, a cobalt(III) species cation, a titanium species cation, a zirconium species cation, $Ti^{n+}$, $Zr^{n+}$, a transition metal cation, a transition metal species cation, a platinum metal cation, a platinum species cation, and combinations thereof.

In some embodiments, the base is a nitrogenous Brønsted base. In some embodiments, the cation is a chiral cobalt(III) species. In some embodiments, a nitrogenous Brønsted base is incorporated into counter anions of the chiral cobalt(III) species cation. In some embodiments, the bifunctional catalyst is a tricationic cobalt(III) hydrogen bond donor catalyst. In some embodiments, a nitrogenous Brønsted base is incorporated into counter anions of the tricationic cobalt(III) hydrogen bond donor catalyst.

In some embodiments, the bifunctional catalysts include smart or task specific counter anions that feature built in bases. In some embodiments, the smart or task specific anions perform a specific role in a chemical reaction without the inclusion of additional external components to accomplish a same specific role in the chemical reaction.

In some embodiments, a pyridyl group is incorporated into the anion. In some embodiments, bond breaking and bond making for a reaction promoted by the bifunctional catalyst is distributed over both the cation and functional groups built into the anion. In some embodiments, the anion includes a secondary amine. In some embodiments, the cation is a chiral cation. In some embodiments, the bifunctional catalyst is an enantioselective catalysis. In some embodiments, the bifunctional catalyst is based upon ionic interactions and includes functionality built into the anion.

In some embodiments, the bifunctional catalyst has a general structure (FIG. 12) of:

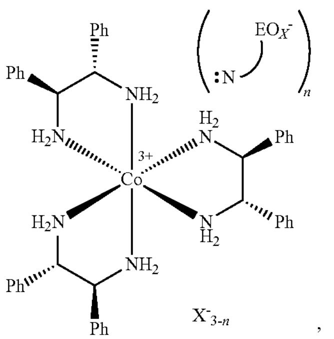

where E/x can include, without limitation, C/2 or S/3, and n is an integer in the range of 1 to 2.

In another aspect, the present disclosure pertains to a bifunctional catalyst having a smart anion with a cationic metal species. In some embodiments, wherein the smart anion performs a specific role in a chemical reaction without the inclusion of additional external components to accomplish a same specific role in the chemical reaction.

In some embodiments, the smart anion and cationic metal species are selected such that the bifunctional catalyst exhibits a mechanistic role in a reaction. In some embodiments, the reaction is a polymerization reaction. In some embodiments, the smart anion and cationic metal species is selected to form an olefin polymerization catalyst.

BRIEF DESCRIPTION OF THE DRAWINGS

A more complete understanding of the subject matter of the present disclosure may be obtained by reference to the following Detailed Description when taken in conjunction with the accompanying Drawings wherein:

FIG. 3A-FIG. 3E illustrate various differences between common traditional monofunctional catalysts and bifunctional catalysts in comparison to bifunctional catalysts of the present disclosure.

DETAILED DESCRIPTION

Figure 1:
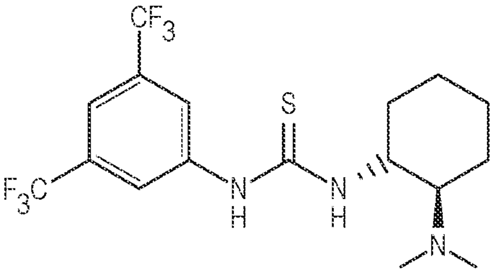
FIG. 1 illustrates previously studied catalysts.
Figure 1:
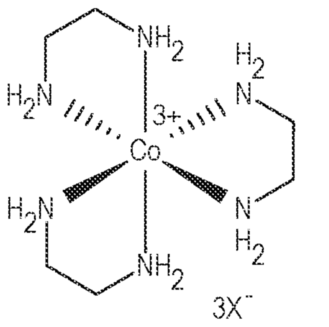
Figure 1:
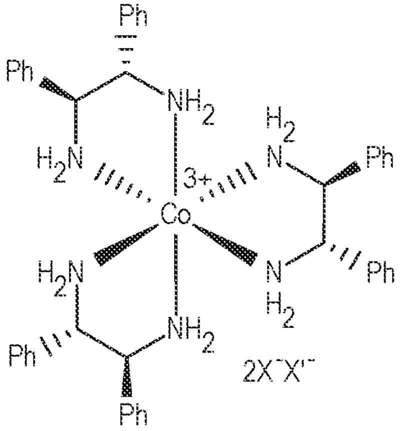
Figure 1:
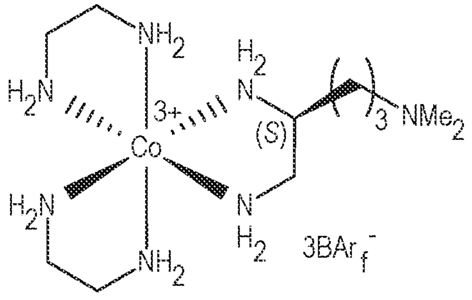

It is to be understood that the following disclosure provides many different embodiments, or examples, for implementing different features of various embodiments. Specific examples of components and arrangements are described below to simplify the disclosure. These are, of course, merely examples and are not intended to be limiting. The section headings used herein are for organizational purposes and are not to be construed as limiting the subject matter described.

There are many catalysts that are salts composed of cations and anions. Bifunctional catalysts, a term that implies a dual role in facilitating a reaction, are often superior to monofunctional catalysts. Despite the numerous literature examples of salts being used as catalysts, no one has introduced functionality into the anion that can assist in bond breaking and forming steps. The present disclosure introduces nitrogenous Brønstead bases into the anion to assist in chemical reactions that require both a (monofunctional) catalysts and a Brønsted base.

The present disclosure demonstrates, inter alia: (1) two different reactions for which a beneficial effect has been demonstrated; (2) reactions that can be catalyzed by combinations of catalysts and Brønsted bases; and (3) the purposeful introduction of any functional group into the anion of catalytically active salt that may aid bond-breaking or bond-forming in the reaction of interest.

Conventional monofunctional ionic catalysts usually require additional external components (e.g., a tertiary amine base) to effectively catalyze chemical reactions. The present disclosure makes new catalysts available on a "drop-in basis" using off-the-shelf base-containing anions. This affords bifunctional catalysts, which frequently perform superiorly to monofunctional catalysts.

The present disclosure pertains to "smart" or "task specific" anions, paired with a chiral cation, which perform specific roles in chemical reactions without the inclusion of additional external components to accomplish the same task. However, this technology is not limited to chiral cations or the enantioselective synthesis of chiral organic molecules. Currently, catalysts of the same category require the addition of external components (e.g., a tertiary amine base) to work effectively while the catalysts of the present disclosure contain all of the necessary components, obviating the need for additional chemical additives, and giving far superior performance (yields, rates, enantioselectivities for chiral systems, etc.).

There is an overwhelming number of chiral organic molecules produced annually, and virtually all modern small molecule pharmaceuticals and agrochemicals contain chiral centers. The synthesis of these compounds requires chiral catalysts often based on expensive metals or require laborious construction. The present disclosure allows for construction of chiral centers through an affordable and easily synthesized catalyst which contains all necessary components to work effectively without the need to add external bases and the like. However, this technology can also be applied to processes that deliver achiral molecules and may have applications in commodity chemicals.

Disclosed herein below, chiral bifunctional catalysts are prepared in which nitrogenous bases are appended to the counter anion instead of the cation. Many such anions are commercially available, and large families of such catalysts can easily be generated on a "drop in" basis, without complicating isomers. These are shown to give excellent results for enantioselective carbon-carbon or carbon-nitrogen bond forming reactions, greatly outperforming analogous monofunctional catalyst systems. This is the first implementation of such a strategy, with bond breaking and making distributed between the cation and functional groups built into the anion.

For example, additions of 1,3-dicarbonyl compounds to C═C or N═N linkages are poorly catalyzed by combinations of pyridine and the enantiopure salts Λ or Δ-$[Co((S,S)\text{-dpen})_3]^{3+}$ $2Cl^{-}BAr_f^{-}$, but when one of the chloride anions is replaced by pyridyl containing nicotinate or isonicotinate anions, highly effective enantioselective catalysts are realized. The lipophilic diastereomeric cobalt complexes Λ- or Δ-$[Co((S,S)\text{-dpen})_3]^{3+}$ $2Cl^{-}BAr_f^{-}$ (Λ- or Δ-(S,S)-$2^{3+}$ $2Cl^{-}BAr_f^{-}$; dpen/$BAr_f^{-}$=1,2-diphenylethylenedimane/B(3,5-$C_6H_3(CF_3)_2)_4$) catalyze a number of enantioselective C—H bond addition reactions in the presence of aliphatic tertiary amines, but pyridine is much less effective. However, when a pyridyl group is incorporated into a counter anion ($4^{-}$) as in Λ- or Δ-(S,S)-$2^{3+}$ $4^{-}Cl^{-}BAr_f^{-}$, highly enantioselective bifunctional catalysts can be realized. Salts of nicotinates, isonicotinates, and related sulfonates are found to be effective. The 6-chloronicotinate salt gives slower rates and lower enantiomeric excess (ee) values, and the 6-aminonicotinate salt gives faster rates and higher ee values. The 6-methyl, 2-methoxy, and unsubstituted analogs afford intermediate results. The 6-aminonicotinate catalyst is applied to additions of dimethyl malonate to fourteen aryl-substituted nitroalkenes, and additions of six 1,3-dicarbonyl compounds to di-t-butyl azodicarboxylate, with average yields/ee values of 82%/85% and 94%/77%, respectively. These are the first ionic catalysts for which Brønsted bases have been incorporated into the anions, which are seldom if ever purposefully functionalized in any manner.

In view of the above, the present disclosure generally relates to chiral cobalt(III) tris(1,2-diamine) catalyst including "smart" or "task specific" anions which perform specific roles in chemical reactions without the inclusion of additional external components to accomplish the same task. This bifunctional catalyst is superior to monofunctional catalysts due to the functionality of the anion in assisting bond breaking and forming steps. The technology disclosed introduces nitrogenous Brønsted bases into the anion to assist in chemical reactions that require both a (monofunctional) catalyst and a Brønsted base. However, this technology is not limited to chiral cations or the enantioselective synthesis of chiral organic molecules. Currently, catalysts of the same category require the addition of external components to work effectively while the present technology contains all of the necessary components, obviating the need for additional chemical additives, and giving far superior performance in production of both chiral and achiral compounds. General advantages include, without limitation, no additional external components required, superior performance due to bifunctional catalyst characteristics, and affordable method using off-the-shelf base-containing anions. The technology disclosed herein provides various applications to, for example, construction of pure pharmaceuticals and agrochemicals containing chiral centers or synthesizing achiral molecules, polymers, and commodity chemicals.

Working Examples

Reference will now be made to more specific embodiments of the present disclosure. However, it should be noted that the disclosure below is for illustrative purposes only and is not intended to limit the scope of the claimed subject matter in any way.

There are large numbers of reactions that require a catalyst and a Brønsted base that is frequently nitrogenous. The base is sometimes required in stoichiometric quantities, whereas other times catalytic loadings suffice. In certain instances, it has proved possible to covalently link these entities such that superior bifunctional catalysts are obtained. A case in point would be Takemoto's catalyst (FIG. 1), in which an achiral thiourea that is an effective hydrogen bond donor is joined with a chiral dimethylaminocyclohexyl fragment. However, applying this strategy to enantioselective catalysis can pose complications. Introducing functional groups will often require lengthier catalyst syntheses, and potentially generates an additional stereocenter. This may lead to mixtures of diastereomers, which are sometimes difficultly separable.

These issues can arise with hydrogen bond donor catalysts based upon the substitution inert, chiral-at-cobalt Werner salts Λ- or Δ-$[Co(en)_3]^{3+}$ $3X^-$ ($1^{3+}$ $3X^-$; FIG. 1). Here Λ or Δ denote the cobalt configurations, en denotes ethylenediamine, and $X^-$ is most often the lipophilic and poorly hydrogen bond accepting anion $BAr_f^-$ ($B(3,5\text{-}C_6H_3(CF_3)_2)_4$). The latter allows this chemistry to be carried out in nonpolar solvents that lack functional groups that might compete for the NH hydrogen bonding sites. However, the $D_3$ symmetric parent trication, historically important as the first inorganic species to be resolved into enantiomers, always gave mediocre enantioselectivities in addition reactions of carbon-hydrogen bonds commonly carried out with nitrogenous Brønsted bases.

Excellent enantioselectivities were obtained with two types of modified catalysts (FIG. 1, bottom). The first featured three 1,2-diphenylethylenediamine (dpen) ligands. Both enantiomers of the non-meso diastereomer are commercially available at surprisingly low prices. Furthermore, both the A and A diastereomers of various lipophilic mixed salts $[Co\text{-}((S,S)\text{-}dpen)_3]^{3+}$ $2X^-X'^-$ ((S,S)-$2^{3+}$ $2X^-X'^-$) can be synthesized with high diasteroselectivities. Due to the six phenyl groups in the trication, one $BAr_f^-$ anion (X') proves sufficient to provide good solubilities in nonpolar solvents. These have proved, when used with $Et_3N$ or N-methylmorpholine, to be highly enantioselective catalysts for a variety of carbon-hydrogen bond addition reactions.

The second featured two en ligands and a third in which one CH hydrogen atom had been replaced by a tertiary-amine-containing $CH_2CH_2CH_2NMe_2$ moiety, Λ-$[Co(en)_2((S)\text{-}H_2NCH((CH_2)_3NMe_2)CH_2NH_2)]^{3+}$ $3BAr_f^-$ (Λ-(S)-$3^{3+}$ $3BAr_f^-$). This catalyst provided even higher enantioselectivities, and now in the absence of an external base. However, the synthesis of the enantiopure substituted ethylenediamine ligand was not trivial, and the catalyst was obtained as a ca. 50:50 mixture of diastereomers, one of which gave poor enantioselectivities and had to be chromatographically separated.

For large numbers of metal based enantioselective catalysts, including the cobalt complexes in FIG. 1, the locus of reactivity is a cation. Thus, the possibility of incorporating nitrogenous Brønsted bases into the accompanying counter anions was considered, as represented by I in FIG. 2. It is well known that counter anions can have significant influences upon rates, product distributions, and enantioselectivities, but they are seldom if ever purposefully functionalized. In an earlier study, the chiral trications Λ- and Δ-(S,S)-$2^{3+}$ with both enantiomers of various chiral anions were combined, and "matched" and "mismatched" combinations that afforded enhanced or diminished enantioselectivities, respectively, were observed.

Accordingly, disclosed herein is the combination of Λ- and Δ-(S,S)-$2^{3+}$ with what can be termed "smart" or "task specific" anions—namely, achiral carboxylate and related oxyanions that contain nitrogenous Brønsted bases. In general, these distinctly outperform benchmark systems that employ stoichiometric or catalytic quantities of the oxyanion-free Brønsted bases. This strategy—which would seem to have potential for considerable generality—has not been previously employed to enhance any other type of catalyst, enantioselective or otherwise. FIG. 3A to FIG. 3E illustrate various differences between common traditional monofunctional catalysts and bifunctional catalysts in comparison to bifunctional catalysts of the present disclosure.

Catalyst design and synthesis. The diastereomeric mixed salts Λ- or Δ-(S,S)-$2^{3+}$ $2Cl^-BAr_f^-$ were synthesized by a two-step procedure from $CoCl_2$ and (S,S)-dpen. Both are isolated as hydrates, as are nearly all new cobalt(III) salts below. For simplicity, the water molecules are ignored in the main text and figures, but are fully represented in experimental data. They are figured into all formula weights and yield calculations.

These salts can be chromatographed on silica gel (typical eluent: 98:2 v/v dichloromethane (DCM)/MeOH), and $^1H$ nuclear magnetic resonance (NMR) spectra show the same relative integration of CH protons in the cation and anion (the NH protons can exchange in some deuterated solvents).

Figure 2:
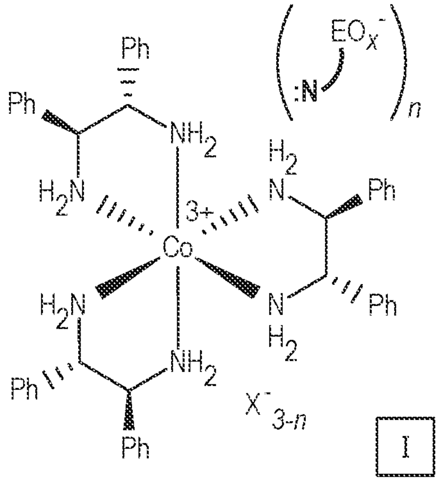
FIG. 2 illustrates a design concept according to an aspect of the present disclosure showing catalysts with "smart" anions containing nitrogenous Brønsted bases (I) and dominant ion pairing motif in solution for the mixed salt Λ-(S,S)-$2^{3+}$ $2Cl^{-}BAr_f^{-}$ (II; each chloride ion associated with one of the two $C_3$ symmetric NH faces). Λ denotes a cobalt configuration.
Figure 2:
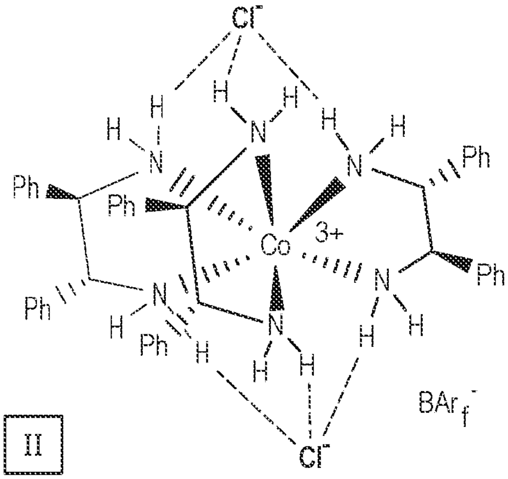
Figure 3E:
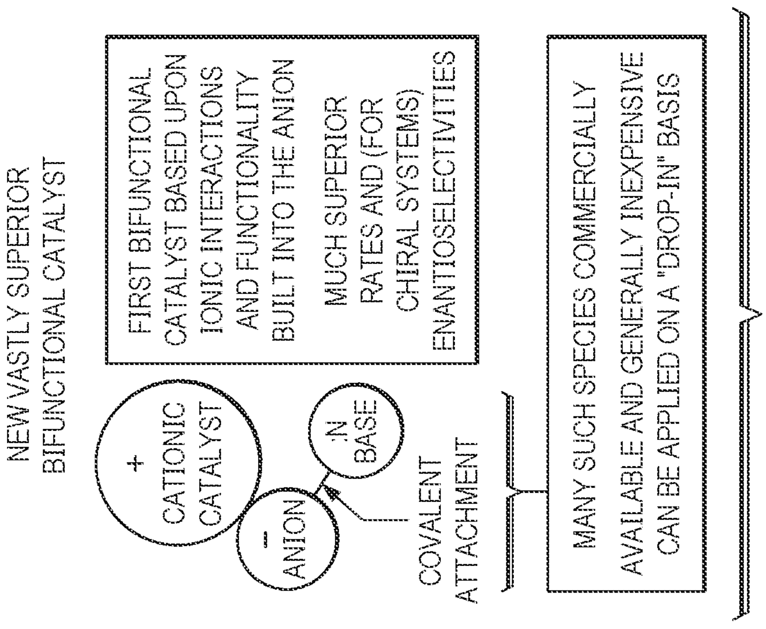
Figure 3D:
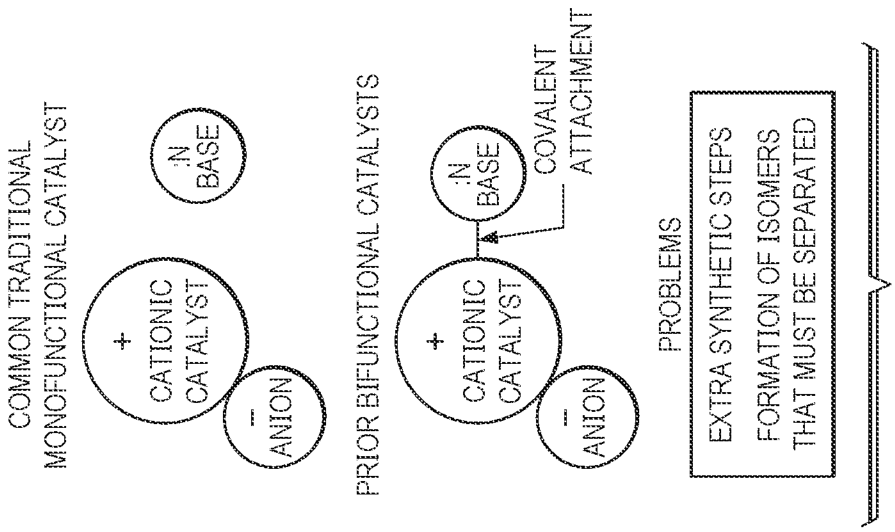

Furthermore, the $D_3$ symmetric trication features two $C_3$ symmetric faces with three nearly synperiplanar NH bonds, each ideally positioned for hydrogen bonding to a chloride anion as shown in II in FIG. 2. Accordingly, six NH protons exhibit $^1$H NMR chemical shifts considerably downfield from the others. Thus, these systems can be confidently represented as mixed $2Cl^-BAr_f^-$ salts, both in solution and the solid state. One with chiral sulfonate anions in place of the chloride anions has been crystallographically characterized.

Given the effectiveness of the dimethylamino containing catalyst Λ-(S)-$3_{3+}3BAr_{f^-}$ (FIG. 1), it would be logical to investigate salts of Λ- and Δ-(S,S)-$2_{3+}$ with carboxylate or other oxyanions that contain aliphatic tertiary amines. There are a number of candidates, many of which would be available in enantiopure form. However, such salts gave disappointing results in initial screens, some of which are briefly described below.

Figure 4:
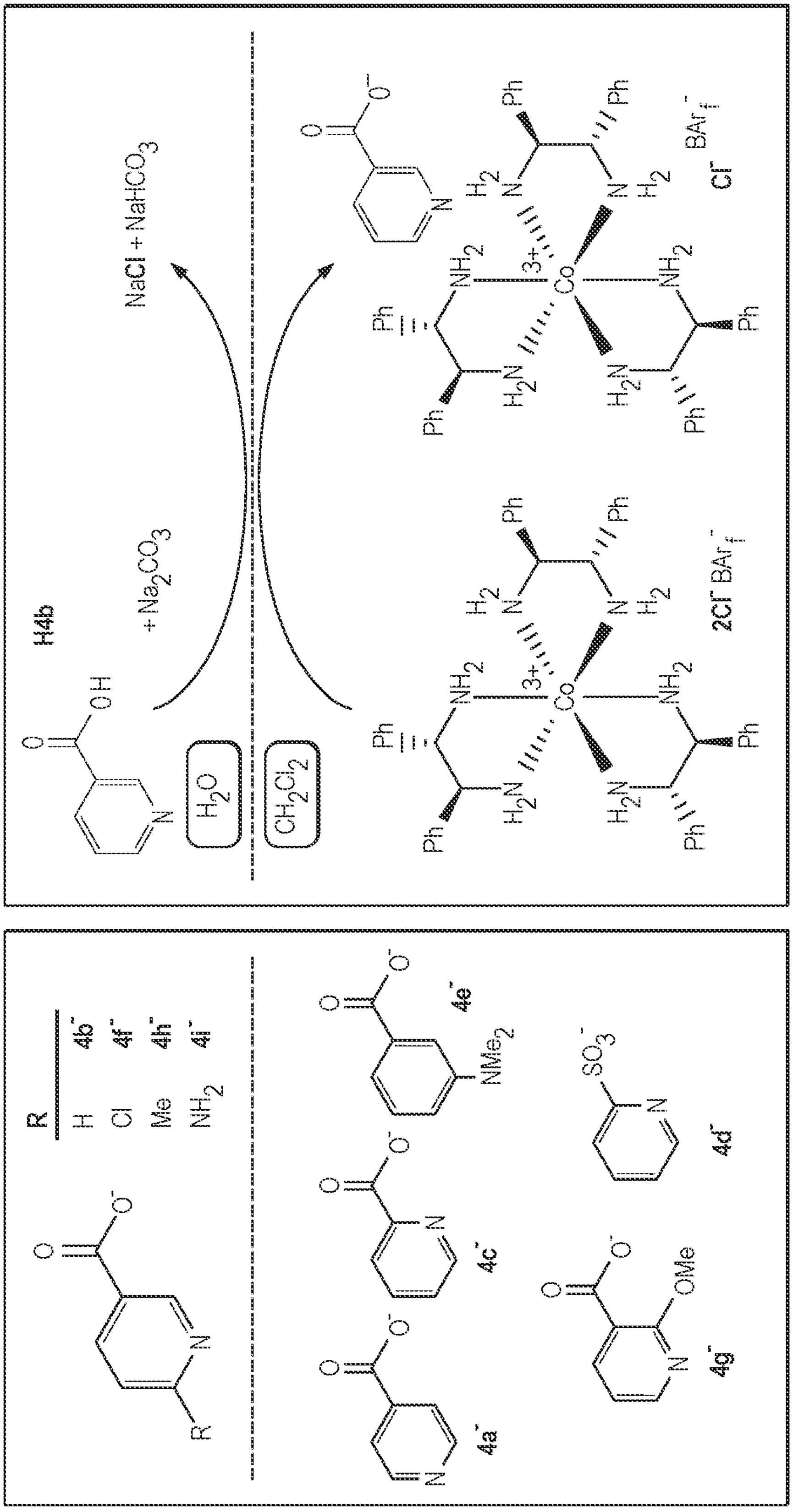
FIG. 4 illustrates biphasic synthesis of representative mixed salt Λ-(S,S)-$2^{3+}$ $4b^{-}Cl^{-}BAr_f^{-}$ ($4b^{-}$=nicotinate$^{-}$), and alternative Brønsted base containing anions studied in the present disclosure. Λ denotes a cobalt configuration

Thus, attention was turned to carboxylic or sulfonic acids that contained more weakly basic pyridyl or dimethylanilinyl moieties. As shown in FIG. 4, DCM solutions of Λ-(S,S)-$2^{3+}$ $2Cl^-BAr_f^-$ were treated with aqueous solutions of $Na_2CO_3$ and the inexpensive commercially available acids H4 corresponding to the conjugate bases $4^-$ in FIG. 4 (3.0-3.3 equiv each). The organic phases were separated and taken to dryness to give the catalysts Λ-(S,S)-$2^{3+}$ $4^-Cl^-BAr_f^-$ as air stable hydrated orange solids in 88-99% yields. Even though the loadings of the acids H4 were sufficient to displace both chloride anions, only one was exchanged, giving rather rare examples of trication salts that feature, at least in a formal sense, three different monoanions. Selected salts of the opposite diastereomer, Δ-(S,S)-$2^{3+}$ $4^-Cl^-BAr_f^-$ (epimeric at cobalt), were similarly prepared.

All catalysts were characterized by NMR ($^1$H, $^{13}$C) and microanalyses. The $^1$H NMR spectra exhibited the correct relative integrations of CH protons in the trication and the $4^-$ and $BAr_f^-$ anions. The chemical shifts of six NH protons were considerably downfield of the other six (3.85-2.25 ppm for the Λ diastereomers). The microanalytical data also matched the proposed formulations. However, in solution it would be easy to envision alternative ion pairings, as further discussed herein.

Catalyst screening; first series. Initial catalyst screening reactions were carried out with salts of the anions 4a-$e^-$, representing the conjugate bases of isonicotinic, nicotinic, picolinic, 2-pyridinesulfonic, and 3-(dimethylamino)benzoic acid—or expressed differently, all three possible pyridine carboxylates, one pyridine sulfonate, and one dimethylamino benzoate. Two test transformations, shown in FIG. 6 and Table 1 and FIG. 7 and Table 2, were selected.

TABLE 1

| Entry | Catalyst | Base | Yield (%)[a] | % ee (Config)[b] |
|---|---|---|---|---|
| 1a | Λ-(S,S)-$2^{3+}$ $2Cl^-BAr_f^-$ | Py 10 mol % | 3 | — |
| 1b | Λ-(S,S)-$2^{3+}$ $2Cl^-BAr_f^-$ | Py 100 mol % | 7 | — |
| 2a | Λ-(S,S)-$2^{3+}$ $2Cl^-BAr_f^-$ | $PhNMe_2$[c] 10 mol % | 1 | — |
| 2b | Λ-(S,S)-$2^{3+}$ $2Cl^-BAr_f^-$ | $PhNMe_2$[c] 100 mol % | 1 | — |
| 3 | Λ-(S,S)-$2^{3+}$ $4a^-Cl^-BAr_f^-$ | — | 90 | 84 (S) |
| 4 | Λ-(S,S)-$2^{3+}$ $4b^-Cl^-BAr_f^-$ | — | 70 | 85 (S) |
| 5 | Λ-(S,S)-$2^{3+}$ $4c^-Cl^-BAr_f^-$ | — | 70 | 85 (S) |
| 6 | Λ-(S,S)-$2^{3+}$ $4d^-Cl^-BAr_f^-$ | — | 60 | 83 (S) |
| 7 | Λ-(S,S)-$2^{3+}$ $4e^-Cl^-BAr_f^-$ | — | 60 | 84 (S) |
| 8 | Δ-(S,S)-$2^{3+}$ $4a^-Cl^-BAr_f^-$ | — | 69 | 31 (R) |
| 9 | Δ-(S,S)-$2^{3+}$ $4b^-Cl^-BAr_f^-$ | — | 92 | 54 (R) |
| 10 | Δ-(S,S)-$2^{3+}$ $4i^-Cl^-BAr_f^-$ | — | 85 | 65 (R) |

[a]Assayed by $^1$H NMR relative to the internal standard $Ph_2SiMe_2$.
[b]Assayed by chiral high-performance liquid chromatography (HPLC).
[c]24 h reaction time.

TABLE 2

| Entry | Catalyst | Base | Yield (%)[a] | % ee (Config)[b] |
|---|---|---|---|---|
| 1 | Λ-(S,S)-$2^{3+}$ $2Cl^-BAr_f^-$ | Py 10 mol % | 27 | 52 (S) |
| 2 | Λ-(S,S)-$2^{3+}$ $2Cl^-BAr_f^-$ | Py 100 mol % | 65 | 62 (S) |
| 3 | Λ-(S,S)-$2^{3+}$ $4a^-Cl^-BAr_f^-$ | — | 99 | 75 (S) |
| 4 | Λ-(S,S)-$2^{3+}$ $4b^-Cl^-BAr_f^-$ | — | 99 | 77 (S) |
| 5 | Λ-(S,S)-$2^{3+}$ $4c^-Cl^-BAr_f^-$ | — | 99 | 70 (S) |
| 6 | Λ-(S,S)-$2^{3+}$ $4d^-Cl^-BAr_f^-$ | — | 83 | 65 (S) |
| 7 | Λ-(S,S)-$2^{3+}$ $4e^-Cl^-BAr_f^-$ | — | 91 | 73 (S) |
| 8 | Δ-(S,S)-$2^{3+}$ $4a^-Cl^-BAr_f^-$ | — | 99 | 67 (R) |
| 9 | Δ-(S,S)-$2^{3+}$ $4b^-Cl^-BAr_f^-$ | — | 99 | 83 (R) |
| 10 | Δ-(S,S)-$2^{3+}$ $4i^-Cl^-BAr_f^-$ | — | 99 | 82 (R) |

[a]Assayed by $^1$H NMR relative to the internal standard $Ph_2SiMe_2$.
[b]Assayed by chiral HPLC.

The first, the reaction of dimethyl malonate (5a) and ß-nitrostyrene (6a) to give the addition product 7a, has been rather widely studied. The other, the addition of the 1,3-dicarbonyl compound 9a to di-t-butyl azodicarboxylate (8) to give 10a, has been somewhat less investigated. Both can be affected with various chiral hydrogen bond donor catalysts and are commonly conducted in the presence of a stoichiometric amount of a trialkylamine base.

Figure 6:
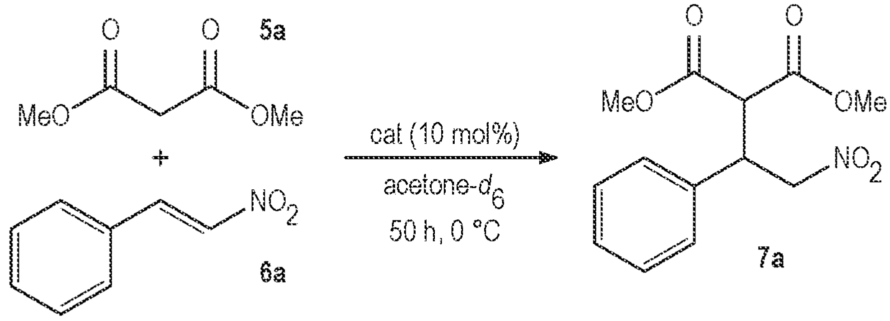
FIG. 6 illustrates catalyst screening according to an aspect of the present disclosure with additions of dimethyl malonate (5a) to trans-β-nitrostyrene (6a). Table 1 shows accompanying information.

FIG. 6 and Table 1 show the initial results for the former reaction, carried out at 0° C. in acetone-$d_6$ with 10% catalyst loadings and an NMR standard to determine absolute yields. First, the parent catalyst Λ-(S,S)-$2^{3+}$ $2Cl^-BAr_f^-$, which lacks Brønsted basic nitrogen atoms, did not affect catalysis alone. Further, as shown in entries 1 and 2, yields of 7a increased to only 3-7% when catalytic or stoichiometric amounts of pyridine were added. However, the five salts Λ-(S,S)-$2^{3+}$ 4a-$e^-$ $Cl^-BAr_f^-$ gave 7a in 83-85% ee (as determined by HPLC) and 60-94% yields after 24 h. Aside from 7a, only unreacted starting material was evident by NMR.

As illustrated by entries 8 and 9, the opposite diastereomers Δ-(S,S)-$2^{3+}$ 4a,$b^-Cl^-BAr_f^-$ afforded lower ee values, with the opposite enantiomer of 7a predominating. This paralleled earlier results with Δ-(S,S)-$2^{3+}$ $2Cl^-BAr_f^-$ and the external base $Et_3N$, and shows the cobalt configuration to be the primary determinant of the product configuration. Analogous behavior was found for all salts of Δ-(S,S)-$2^{3+}$ examined.

Figure 7:
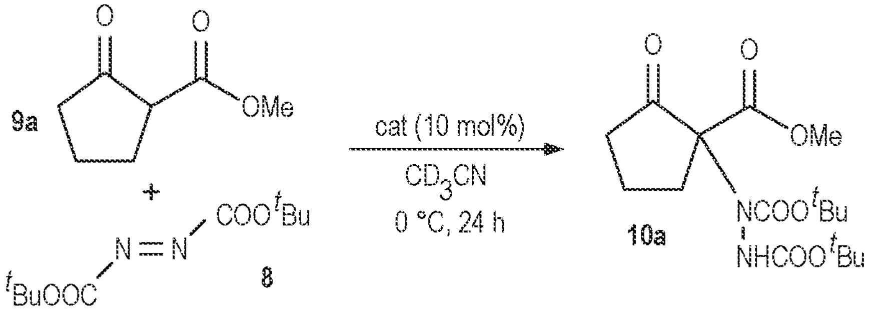
FIG. 7 illustrates catalyst screening according to an aspect of the present disclosure with additions of methyl 2-oxocyclopentane-1-carboxylate (9a) to di-t-butyl azodicarboxylate (8). Table 2 shows accompanying information.

FIG. 7 and Table 2 summarize the data for the latter reaction, similarly carried out but in $CD_3CN$. Entries 1 and 2 show that the combination of Δ-(S,S)-$2^{3+}$ $2Cl^-BAr_f^-$ and external pyridine (10-100 mol %) affords the addition product 10a in moderate yields (27-65%) and enantioselectivities (52-67% ee). However, entries 3-7 establish that significantly better results are achieved with the five bifunctional catalysts Λ-(S,S)-$2^{3+}$ 4a-$e^-Cl^-BAr_f^-$ (83-99% yields, 65-77% ee). Aside from 10a, only unreacted starting material was evident by NMR.

As illustrated by entries 8 and 9, the opposite diastereomers Δ-(S,S)-$2^{3+}$ 4a,$b^-Cl^-BAr_f^-$ give 10a with comparable yields (99%) and enantioselectivites (67-83% ee) and opposite absolute configurations. By a modest margin, the highest ee value is now realized in the Λ diastereomer series (83% vs 77%), paralleling earlier results with Δ-(S,S)-$2^{3+}$ $2Cl^-BAr_f^-$ and the external base N-methylmorphyline. Thus, the diastereomer that gives the best enantioselectivities depends upon the test reaction.

Catalyst screening; second series. Overall, the top performer among (S,S)-$2^{3+}$ 4a-$e^-$ $Cl^-BAr_f^-$ was judged to be nicotinic acid derived (S,S)-$2^{3+}$ 4b-$Cl^-BAr_f$, although other salts were not without promise. In the interest of further optimization, analogs with the substituted nicotinates 4f-$i^-$ (FIG. 4) were investigated. These featured both electron donating and withdrawing groups. As summarized in FIG. 8 and Table 3, Λ-(S,S)-$2^{3+}$ 4f-$i^-Cl^-BAr_f^-$ were evaluated in the same malonate/nitroalkene addition reaction employed in FIG. 6 and Table 1, but now carried out for 48 h at room temperature unless noted.

TABLE 3

| Entry | Catalyst | Yield (%)[a] | % ee (Config)[b] |
|---|---|---|---|
| 1 | Λ-(S,S)-$2^{3+}$ $4f^-Cl^-BAr_f^-$ | 33 | 79 (S) |
| 2 | Λ-(S,S)-$2^{3+}$ $4g^-Cl^-BAr_f^-$ | 69 | 84 (S) |
| 3 | Λ-(S,S)-$2^{3+}$ $4b^-Cl^-BAr_f^-$ | 63 | 86 (S) |
| 4 | Λ-(S,S)-$2^{3+}$ $4h^-Cl^-BAr_f^-$ | 58 | 84 (S) |
| 5 | Λ-(S,S)-$2^{3+}$ $4i^-Cl^-BAr_f^-$ | 95[c] | 87 (S) |

[a]Assayed by $^1H$ NMR relative to the internal standard $Ph_2SiMe_2$.
[b]Assayed by chiral HPLC.
[c]This yield is after 22 h.

As shown in entry 1, the chloronicotinate catalyst Λ-(S,S)-$2^{3+}$ $4f^-Cl^-BAr_f^-$ afforded the poorest results, with a distinctly lower yield of 7a (33%) and slightly lower enantioselectivity (79% ee). The methoxy and methyl substituted catalysts Λ-(S,S)-$2^{3+}$ 4g,$h^-Cl^-BAr_f^-$ (entries 2, 4) performed comparably to Λ-(S,S)-$2^{3+}$ $4b^-Cl^-BAr_f$, giving yields of 69-58% and enantioselectivities of 84% ee. More importantly, amino substituted Λ-(S,S)-$2^{3+}$ $4i^-Cl^-BAr_f^-$ (entry 5) afforded a distinctly higher yield and rate (95% after 22 h as compared to 68-33% after 48 h) and a slightly higher ee value (87%). This corresponds to the least acidic nicotinic acid, or the most basic and presumably most hydrogen bond accepting nicotinate.

Figure 5:
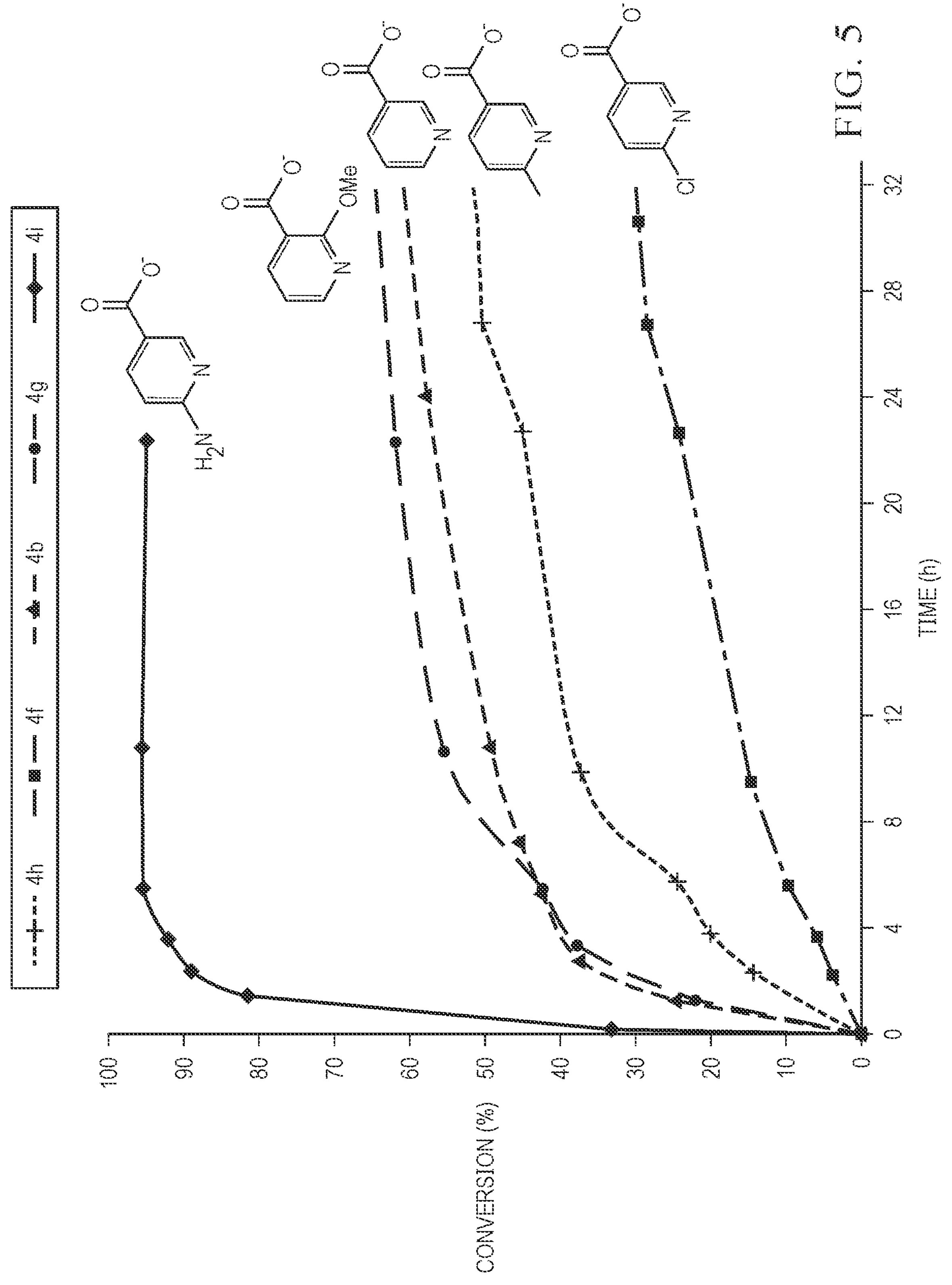
FIG. 5 illustrates effect of nicotinate anion substituents upon the rates of addition of dimethyl malonate (5a) to trans-β-nitrostyrene (6a) under the conditions shown in FIG. 8 and Table 3.
Figure 8:
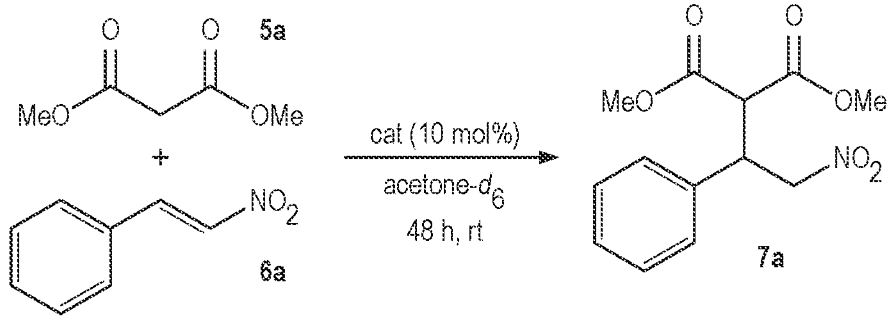
FIG. 8 illustrates catalyst optimization for effect of nicotinate anion substituents upon yields and enantioselectivities for the addition in FIG. 6 and Table 1. Table 3 shows accompanying information.

In order to better define the trends in FIG. 8 and Table 3, yields were monitored as a function of time. The results, shown in FIG. 5, dramatically illustrate the superior qualities of the aminonicotinate catalyst Λ-(S,S)-$2^{3+}$ $4i^-Cl^-BAr_f^-$ and the deleterious effect of an electron withdrawing chloride nicotinate substituent. However, outside of the product 7a, in all cases only starting material could be detected by NMR.

Catalyst scope. The aminonicotinate salt Λ-(S,S)-$2^{3+}$ $4i^-Cl^-BAr_f^-$ was then applied to the additions of dimethyl malonate to fourteen aryl substituted nitroolefins (6a-n) at 0° C. in acetone-$d_6$. As summarized in FIG. 9, after 24 h the products 7a-n were obtained in average/median yields and ee values of 82%/90% and 85%/87%, respectively. The dominant absolute configurations of most adducts could be assigned by previously established chiral HPLC relationships. These always corresponded to the same relative configuration. Thus, for the three cases for which HPLC assignments have not yet been established (7e, l, m), identical relative configurations were presumed.

Figure 9:
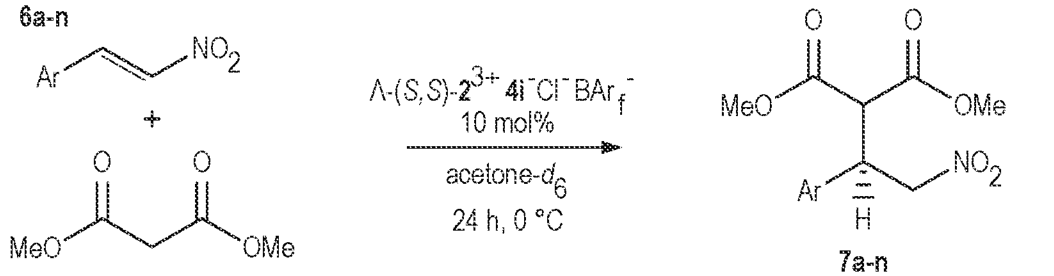
FIG. 9 illustrates substrate scope of additions of dimethyl malonate (5a) to arene-substituted nitroolefins (6a-n) with the optimized catalyst Λ-(S,S)-$2^{3+}$ $4i^{-}Cl^{-}BAr_f^{-}$ according to aspects of the present disclosure. Legend: [a] Yields assayed by $^{1}H$ nuclear magnetic resonance (NMR) relative to the internal standard $Ph_2SiMe_2$; enantiomeric excess (ee) values assayed by chiral high-performance liquid chromatography (HPLC). [b] This configuration is inferred as described herein. [c] This yield is after 48 h; an additional 10 mol % of catalyst is added after 24 h. Λ denotes a cobalt configuration.
Figure 9:
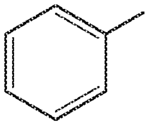
Figure 9:
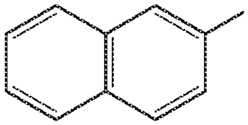
Figure 9:
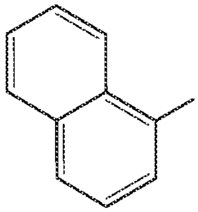
Figure 9:
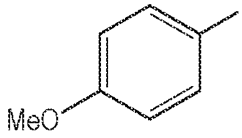
Figure 9:
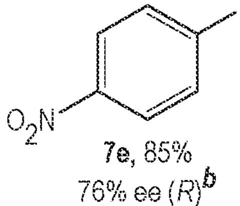
Figure 9:
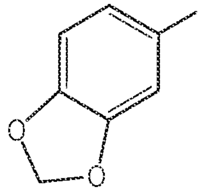
Figure 9:
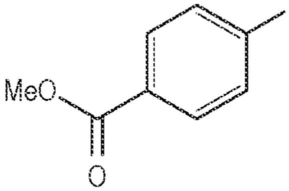
Figure 9:
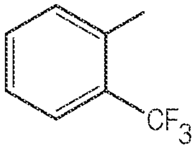
Figure 9:
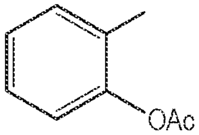
Figure 9:
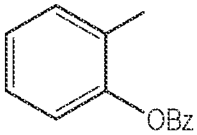
Figure 9:
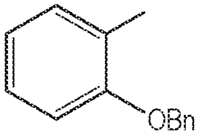
Figure 9:
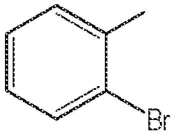
Figure 9:
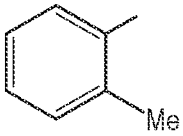
Figure 9:
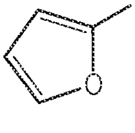

Of the products in FIG. 9, the two lowest yields (37%, 28%) were encountered with 2-(benzyloxy)phenyl and 2-furyl substituents (7k,n). However, NMR analyses showed substantial amounts of starting materials. Accordingly, after the standard 24 h reaction time, another 10 mol % charge of catalyst was added. After an additional 24 h, the yields had increased substantially (95%, 87%), raising the average/median yields to 90%/93%. To ensure that the NMR yields translate into comparable preparative yields, the reaction of 5a and 6f was repeated on a 0.1 g scale. A chromatographic workup gave 7f in 88% yield and 96% ee.

When the aryl groups in 6a-n were replaced by a trans ß-styryl (PhCH═CH) moiety, the yields and enantioselectivities dropped to 14% and 73% ee. Thus, extensions of these protocols to nitroalkenes that lack aryl substituents may be problematic. When dimethyl malonate 5a was replaced by diethyl malonate 5a-Et in the addition to 6a, the yield and enantiomeric excess of the product 7a-Et fell only slightly (90%, 80% ee). However, the decreases were dramatic for diisopropyl and di-t-butyl malonate.

Figure 10:
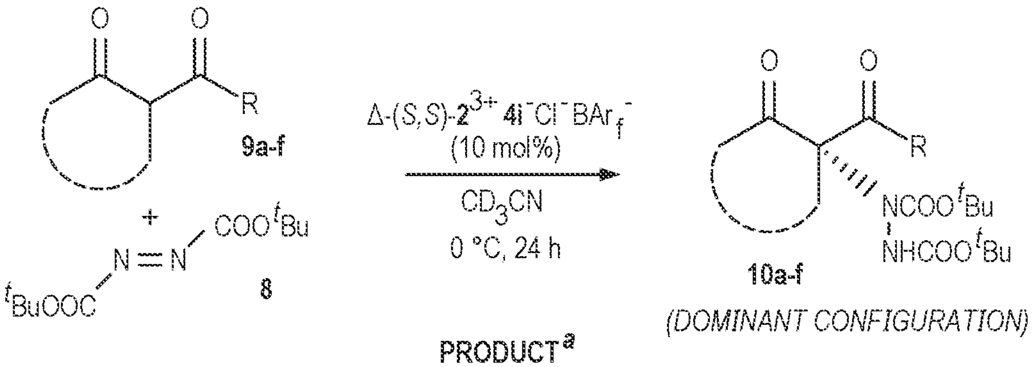
FIG. 10 illustrates substrate scope of additions of dicarbonyl compounds (9a-f) to di-t-butyl azodicarboxylate (8) with the optimized catalyst Δ-(S,S)-$2^{3+}$ $4i^{-}Cl^{-}BAr_f^{-}$ according to aspects of the present disclosure. Legend: [a] Yields assayed by $^{1}H$ NMR relative to the internal standard $Ph_2SiMe_2$; ee values assayed by chiral HPLC. [b] This configuration is inferred as described herein. Δ denotes a cobalt configuration.
Figure 10:
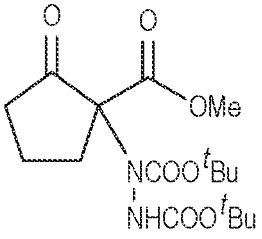
Figure 10:
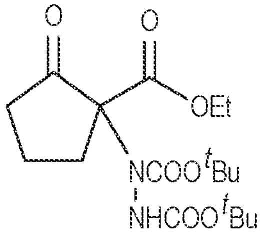
Figure 10:
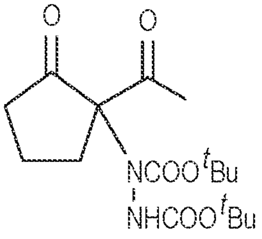
Figure 10:
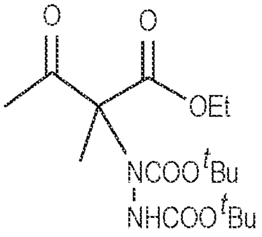
Figure 10:
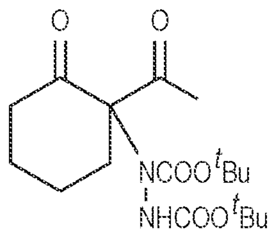
Figure 10:
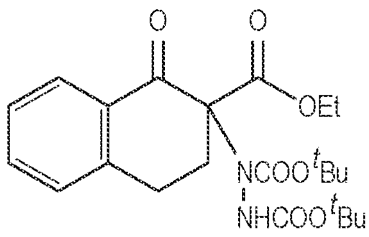

The scope of 1,3-dicarbonyl compound additions to di-t-butyl azodicarboxylate (8) that can be catalyzed by the opposite diastereomer Δ-(S,S)-$2^{3+}$ $4i^-Cl^-BAr_f^-$ at 0° C. in $CD_3CN$ was similarly explored. As shown in FIG. 10, six different substrates (9a-f) afforded products (10a-f) in yields ranging from 90 to 99% (average 94%) and enantioselectivites ranging from 86% to 51% ee (average 77%). The dominant absolute configurations were assigned as for FIG. 9.

A significant and seemingly unprecedented discovery presented herein involves the extraordinary synergism that can be realized when nitrogenous Brønsted bases are incorporated into the counter anions of the tricationic cobalt(III) hydrogen bond donor catalyst (S,S)-$2^{3+}$. This synergism is enormous for the test reaction in FIG. 6 and Table 1, and substantial for that in FIG. 7 and Table 2. The catalysts can be said to have "smart" or "task specific" counter anions that feature "built in bases". Counter anions have been modified to realize certain phase affinities, and chiral counter anions have been used to optimize the catalytic performance of certain chiral metal cations. However, any purposeful attempts to introduce functional groups into counter anions that would take part in bond breaking and bond making remains unreported.

In the neighboring field of ionic liquids, considerable attention has been given to "task specific" cations and anions for optimizing performances in diverse applications, including catalysis. However, even in this voluminous are, no prior efforts to incorporate $sp^2$- or $sp^3$-hybridized nitrogen donor atoms into the anions has been identified. Furthermore, studies involving "ionic liquids" and "nicotinate" or related combinations are not found.

The overall constitution of the mixed salt catalysts (S,S)-$2^{3+}$ $4^-Cl^-BAr_f^-$ is secure from the NMR and micro-analytical data. Nonetheless, it can be questioned whether they might be better represented by other formulations, as in solution it would be easy to envision ion pairing equilibria. It is suggested that the dominant species feature two of the hydrogen bond accepting (or "non-$BAr_f^-$") anions per cobalt trication—i.e., (S,S)-$2^{3+}$ 4-$Cl^-BAr_f^-$, (S,S)-$2^{3+}$ 24-$BAr_f$, and (S,S)-$2^{3+}$ 2$Cl^-BAr_f^-$ so as to maximize the types of interactions in II in FIG. 2.

Mechanistic analysis is also impeded by the many NH donor groups that might participate at any stage on the reaction coordinate. It would be easy to envision simultaneous interactions involving four or five—a much more complex situation than with Takemoto's catalyst, which can only offer two NH groups. The nicotinate anion almost certainly deprotonates the 1,3-dicarbonyl reactants in FIG. 6 to FIG. 10 and Table 1 to Table 3, but there are numerous possibilities for the concomitant hydrogen bonding motif. These issues did eventually prove computationally tractable for a cationic chiral ruthenium hydrogen bond donor catalyst in which the cation featured an internal nitrogenous Brønsted base.

Despite these uncertainties, certain phenomenological observations may offer insight. For example, the $pK_a$(BH) value for the nicotinate anion $4b^-$ is 4.75, indicating a weaker base than $Et_3N$ ($pK_a(BH^+)$ 10.7) and N-methylmorpholine ($pK_a(BH^+)$ 7.4), the most effective external bases for the reactions in FIG. 6 to FIG. 10 and Table 1 to Table 3. The nicotinate anion is also slightly less basic than pyridine ($pK_a(BH^+)$ 5.17). However, any initial impression that a lower basicity may be of importance is dashed by the much poorer results with the 2-chloronicotinate anion $4f^-$ ($pK_a$(BH) 3.24) and the superior results with the 2-aminonicotinate anion $4i^-$ ($pK_a$(BH) 6.30).

Another issue is whether the nicotinate anions function as oxygen or nitrogen bases. The equilibrium between the N-protonated zwitterionic and O-protonated non-zwitterionic forms of nicotinic acid (H4b) is highly dependent upon solvent and temperature, with the latter generally favored in organic solvents. Thus, in a thermodynamic sense O-protonation would be favored. However, with the 2-aminonicotinic acid H4i, the equilibrium should be shifted more in the N-protonated zwitterion direction, as supported by the much enhanced basicity of 2-aminopyridine ($pK_a(BH^+)$ 6.71) versus pyridine. Since 2-aminonicotinate gives the most effective catalyst, (S,S)-$2^{3+}$ $4i^-Cl^-BAr_f^-$, this argues for a role of the nitrogenous basic site.

Prior to the successful run of chemistry in FIG. 6 to FIG. 10 and Table 1 to Table 3, a number of related salts of Λ-(S,S)-$2^{3+}$ were prepared, partially characterized, and screened as catalysts. These included various trialkylamine containing counter anions, such as $Me_2N(CH_2)_nCO_2^-$ (n=1-3) or $Me_2N(CH_2)_2SO_3^-$. While some gave moderate enantioselectivies, they did not attain the levels in FIG. 6 and Table 1. It was noted in passing that the $pK_a$(BH) values for the carboxylates with n=1 (9.94) and 2 (9.85) are much higher than the other external and internal bases in use.

In FIG. 6 and Table 1 and FIG. 7 and Table 2, the yield and ee data are benchmarked—appropriately—to the external base pyridine, which is ineffective or only moderately effective. However, it is also important to compare the new data to optimized results with Λ-(S,S)-$2^{3+}$ 2$Cl^-BAr_f^-$ and the external bases $Et_3N$ and N-methylmorpholine. While the yields are comparable, the average ee values are slightly lower. In FIG. 9, those for the eight substrates common to both studies are 87% ee (this study) versus 89% ee ($Et_3N$ external base). With FIG. 10, those for the five substrates common to both studies are 76% ee (this study) versus 93% ee (N-methylmorpholine external base)

FIG. 6 to FIG. 8 and Table 1 to Table 3 by no means exhaust the possible optimization strategies for this class of catalysts. For example, the overall efficacy of the isonicotinate catalyst Λ-(S,S)-$2^{3+}$ $4c^-Cl^-BAr_f^-$ is not so different from that of Λ-(S,S)-$2^{3+}$ 4b-$Cl^-BAr_f^-$. Indeed, a variety of substituted isonicotinic acids are commercially available, and certain adducts might outperform the benchmark aminonicontinate catalyst Λ-(S,S)-$2^{3+}$ $4i^-Cl^-BAr_f$. There is seemingly an excellent opportunity for the application of multivariate analysis or other statistical methods to guide optimization. Finally, the many enantiopure carboxylic acids derived from alkaloids, many of which feature pyridine or related heteroarene units, should not be overlooked.

Figure 11A:
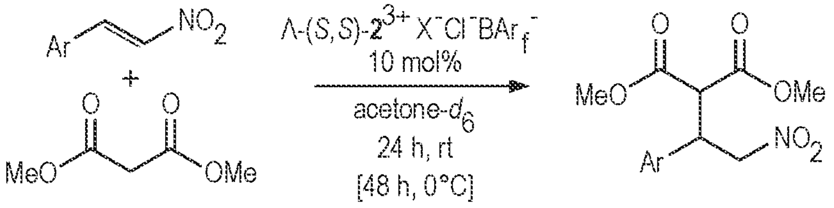
FIG. 11A-FIG. 11B illustrate additional "smart" anions according to aspects of the present disclosure. Λ denotes a cobalt configuration.
Figure 11A:
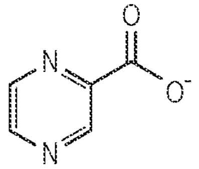
Figure 11A:
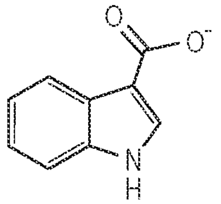
Figure 11A:
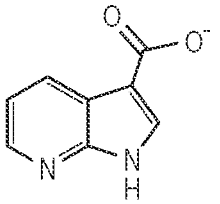
Figure 11A:
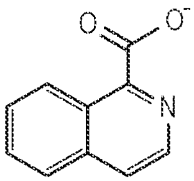
Figure 11A:
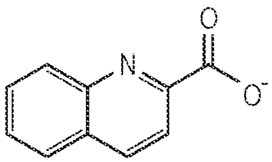
Figure 11A:
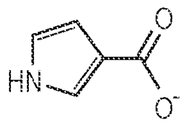
Figure 11A:
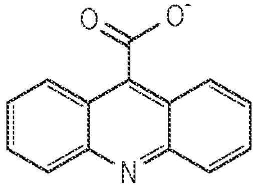
Figure 11B:
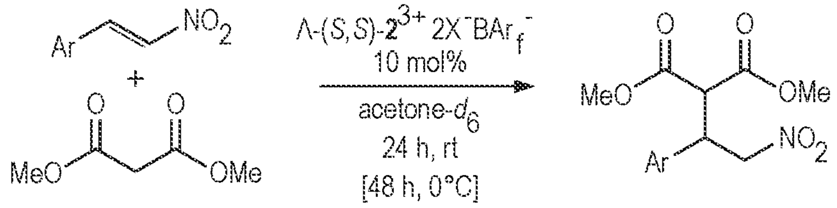
Figure 11B:
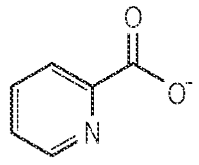
Figure 11B:
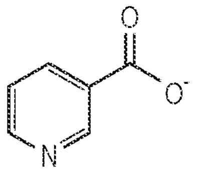
Figure 11B:
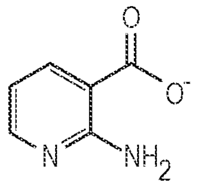
Figure 11B:
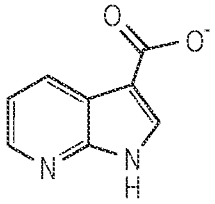
Figure 11B:
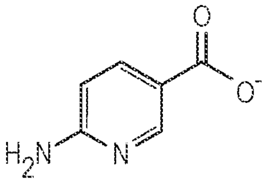
Figure 11B:
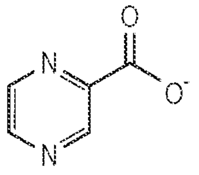
Figure 11B:
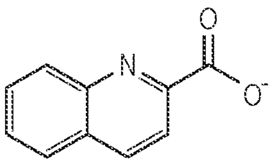
Figure 11B:
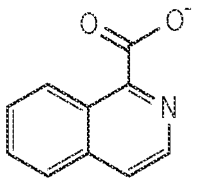
Figure 11B:
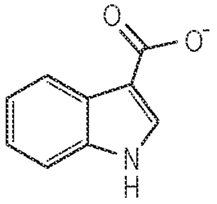
Figure 11B:
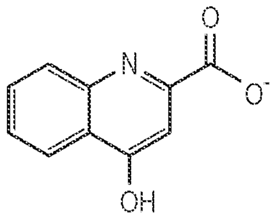
Figure 11B:
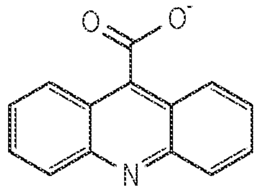

In conclusion, bifunctional catalysis is an immense field with numerous contributors and much current activity. Despite this breadth, no other system in which bond breaking and bond making for a reaction promoted by an ionic catalyst is distributed over both the cation and functional groups built into the anion exists. At first glance, such a strategy would seemingly have the potential to be inefficient, but the opposite has been demonstrated with the catalysts (S,S)-$2^{3+}$ $4^-Cl^-BAr_f^-$ in FIG. 6 to FIG. 10 and Table 1 to Table 3. FIG. 11A to FIG. 11B illustrate additional "smart" anions according to aspects of the present disclosure.

This disclosure adds to the growing body of catalytic reactions that are promoted by noncovalent interactions between ligands and substrates. Some of the more relevant earlier efforts would involve bifunctional (cationic) chiral-at-metal containing hydrogen bond donor catalysts investigated by others. However, the present data establishes a new paradigm for the design of bifunctional catalysts, which is not limited to systems with metal-containing cations. Salts in which the anions contain secondary amines, applicable to other types of condensations, would constitute another obvious target. Further applications of "smart" or "task specific" anions in catalysis are further envisioned.

Figure 12:
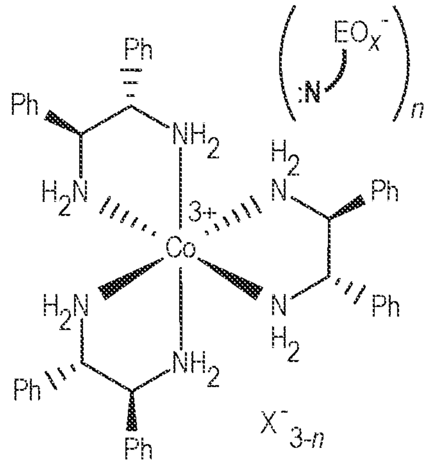
FIG. 12 illustrates a general structure of a bifunctional catalyst according to aspects of the present disclosure. Legend: E/x=C/2, S/3, etc. (n is an integer).

As such, in some embodiments, the bifunctional catalyst can have a general structure (FIG. 12) of:

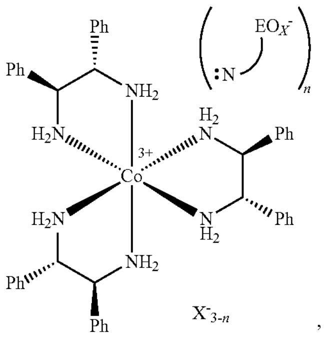

, where E/x can include, without limitation, C/2 or S/3, and n is an integer in the range of 1 to 2.

Example Experimental Procedures and Results

Reference will now be made to more specific experimental procedures of the present disclosure. However, it should be noted that the disclosure below is for illustrative purposes only and is not intended to limit the scope of the claimed subject matter in any way. All reactions and workups were conducted in air. General procedures are provided below.

Catalyst synthesis; general procedure. To a solution of (S,S)-$2^{3+}$ 2$Cl^-BAr_f^-\cdot nH_2O$ (Λ, n=2 or Δ, n=1) 0.050 g, 0.030 mmol, 1.0 equiv) in DCM (5 mL) was added a solution of an aryl substituted carboxylic or sulfonic acid (4a-i, FIG. 4; 0.089 mmol, 3.0 equiv.) and $Na_2CO_3$ (0.011 g, 0.099 mmol, 3.3 equiv.) in water (5 mL). The biphasic mixture was rapidly stirred for 30 min. The organic layer was separated, washed with water (5 mL), dried ($NaSO_4$), and taken to dryness by rotary evaporation.

Catalyst screening, nitrostyrene addition (FIG. 6 and Table 1). A vial was charged with trans-β-nitrostyrene (6a; 0.009 g, 0.060 mmol, 1.0 equiv), dimethyl malonate (5a; 0.0076 mL, 0.066 mmol, 1.1 equiv), $Ph_2SiMe_2$ (0.0013 mL, internal standard), pyridine (1.0-0.0 equiv, delivered volumetrically), acetone-$d_6$ (0.600 mL), and a stir bar, and cooled to 0° C. The catalyst (0.0060 mmol, 10 mol %) was added in one portion with stirring. After 50 h at 0° C., the solution was transferred to an NMR tube and the yield of 7a assayed by $^1H$ NMR. The solvent was removed by rotary evaporation, and the residue chromatographed on silica (glass pipet, 25:75 v/v EtOAc/hexanes). The solvent was removed from the product containing fractions by rotary evaporation to give 7a as a colorless oil. Enantiomeric excesses were assayed by HPLC with a Chiralcel AD column (98:2 v/v hexane/isopropanol, 1 m/min, λ=220 nm); $t_R$=32.9 min (major), 43.6 min (minor).

NMR ($CDCl_3$, δ/ppm): $^1H$ (400 MHz) 7.35-7.26 (m, 3H), 7.23-7.18 (m, 2H), 4.97-4.80 (m, 2H), 4.23 (td, $^3J_{HH}$=8.9, 5.3 Hz, 1H), 3.85 (d, $^3J_{HH}$=9.0 Hz, 1H), 3.75 (s, 3H), 3.55 (s, 3H); $^{13}C\{^1H\}$ (100 MHz): 168.0, 167.4, 136.3, 129.2, 128.6, 128.0, 77.5, 54.9, 53.2, 53.0, 43.0 (11×s).

Catalyst screening, azodicarboxylate addition (FIG. 7 and Table 2). A vial was charged with methyl 2-oxocyclopentane-1-carboxylate (9a; 0.0076 mL, 0.061 mmol, 1.0 equiv), di-t-butyl azodicarboxylate (8; 0.014 g, 0.061 mmol, 1.0 equiv), $Ph_2SiMe_2$ (0.0013 mL, internal standard), pyridine (1.0-0.0 equiv, delivered volumetrically), $CD_3CN$ (0.600 mL), and a stir bar, and cooled to 0° C. The catalyst (0.0060 mmol, 10 mol %) was added in one portion with stirring. After 50 h at 0° C., the solution was assayed and worked up per the preceding procedure to give 10a as a colorless oil. Enantiomeric excesses were determined by HPLC with a Chiralcel AD column (96:4 v/v hexane/isopropanol, 1 mL/min, λ=210 nm); $t_R$=13.7 min (min), 19.4 min (major).

NMR ($CDCl_3$, δ/ppm): $^1H$ (500 MHz) 6.70-6.03 (m, 1H), 3.76 (s, 3H), 2.97-2.03 (m, 5H), 2.03-1.81 (s, 1H), 1.53-1.29 (m, 18H).

Catalyst screening, substituted nicotinate salts (FIG. 8 and Table 3 and FIG. 4). A vial was charged with 6a (0.009 g, 0.060 mmol, 1.0 equiv), $Ph_2SiMe_2$ (0.0013 mL, internal standard), catalyst (0.0060 mmol, 10 mol %), and acetone-$d_6$ (0.600 mL). The solution was transferred to an NMR tube and an initial $^1H$ NMR spectrum recorded. Then 5a (0.0076 mL, 0.066 mmol, 1.1 equiv) was added and a second $^1H$ NMR spectrum immediately acquired. A stir bar was added and the solution was stirred (48 h, rt). The yield of 7a was periodically assayed by $^1H$ NMR (data: FIG. 4). The solvent was removed by rotary evaporation and the residue chromatographed on silica (glass pipet, 25:75 v/v EtOAc/hexanes). The solvent was removed from the product containing fractions by rotary evaporation to give 7a as a colorless oil, which was analyzed as described for FIG. 6 and Table 1.

Substrate scope, nitroolefin additions (FIG. 9). A vial was charged with nitroolefin (6; 0.060 mmol, 1.0 equiv), $Ph_2SiMe_2$ (0.0013 mL, internal standard), Λ-(S,S)-$2^{3+}$ $4i^-Cl^-BAr_f^-\cdot 2H_2O$ (0.0107 g, 0.0060 mmol, 10 mol %), and acetone-$d_6$ (0.600 mL). The solution was transferred to an NMR tube and an initial $^1H$ NMR spectrum recorded. The sample was cooled to 0° C. A stir bar and 5a (0.0076 mL, 0.066 mmol, 1.1 equiv) were added. The solution was stirred (24 h, 0° C.). The yield of product 7 was assayed by $^1H$ NMR, the solvent removed by rotary evaporation, and the residue chromatographed on silica (glass pipet, 25:75 v/v EtOAc/hexanes). The solvent was removed from the product containing fractions by rotary evaporation. Enantiomeric excesses were determined by HPLC.

Substrate scope, azodicarboxylate additions (FIG. 10). A vial was charged with a 1,3-dicarbonyl compound (9; 0.060 mmol, 1.0 equiv), $Ph_2SiMe_2$ (0.0013 mL, internal standard), di-t-butyl azodicarboxylate (0.0153 g, 0.066 mmol, 1.1 equiv) and $CD_3CN$ (0.400 mL). The solution was transferred to an NMR tube and an initial $^1H$ NMR spectrum recorded. The sample was cooled to 0° C. A stir bar and a solution of Λ-(S,S)-$2^{3+}$ $4i^-Cl^-BAr_f^-\cdot 2H_2O$ (0.0107 g, 0.0060 mmol, 10 mol %) in $CD_3CN$ (0.200 mL) were added. The solution was stirred (24 h, 0° C.). The yield of product 10 was assayed by $^1H$ NMR, the solvent removed by rotary evaporation, and the residue chromatographed on silica (glass pipet, 25:75 v/v EtOAc/hexanes). The solvent was removed from the product containing fractions by rotary evaporation. Enantiomeric excesses were determined by HPLC.

Typical preparative reaction. A vial was charged with 6f (see FIG. 9; 0.100 g, 0.52 mmol, 1.0 eq), Λ-(S,S)-$2^{3+}$ $4i^-Cl^-BAr_f^-\cdot 2H_2O$ (0.092 g, 0.052 mmol, 10 mol %), and acetone (6 mL) and cooled to 0° C. Then 5a (0.082 g, 0.620 mmol, 1.2 eq) was added with stirring. After 48 h, the solvent was removed by rotary evaporation. The residue was chromatographed on silica (glass column, 20:80 v/v EtOAc/hexanes). The solvent was removed from the product containing fractions by rotary evaporation to give 7f as a white solid (0.148 g, 0.46 mmol, 88%, 96% ee), mp 86.0-88.6° C. (lit: 86.0-87.5° C.).

NMR ($CDCl_3$, δ/ppm, 500 MHz): $^1H$ (500 MHz) 6.70 (m, 3H), 5.94 (s, 2H), 4.87 (dd, $^2J_{HH}$=13.1 Hz, $^3J_{HH}$=4.9, 1H), 4.80 (dd, $^2J_{HH}$=13.1, $^3J_{HH}$=9.3 Hz, 1H), 4.15 (td, $^3J_{HH}$=9.2, 4.9 Hz, 1H), 3.80 (d, $^3J_{HH}$=9.1 Hz, 1H), 3.76 (s, 3H), 3.70 (s, 3H); $^{13}C\{^1H\}$ (125 MHz) 167.9, 167.3, 148.2, 147.7, 129.7, 121.5, 108.8, 108.2, 101.4, 77.7, 55.0, 53.2, 53.0, 42.8, (14×s).

Syntheses of nitroolefin substrates. Nitroolefins 6a-d and 6h-k were used from a previous work, in which they were prepared by Henry reactions with nitromethane. Nitroolefins 6f,n were available commercially, and 6e, l, m were synthesized by literature procedures.

trans-p-(methoxycarbonyl)-β-nitrostyrene (6g). A round-bottom flask was charged with 4-formylbenzoic acid methyl ester (0.250 g, 1.52 mmol, 1.0 equiv), nitromethane (1.5 mL), and ammonium acetate (0.035 g, 0.457 mmol, 30 mol %). The mixture was refluxed (2 h) and allowed to cool. The thick slurry was transferred to a sintered glass frit, and the solvent was pulled through by vacuum. The residue was triturated with a minimal amount of methanol, and the solid transferred to a vial and dried by oil pump vacuum (rt, 14 h) to give 6g as a yellow-green solid (0.124 g, 0.598 mmol, 39%), mp 178.4-181.8° C. (open capillary). IR (powder film, $cm^{-1}$): 3103, 3051, 2959, 1710, 1635, 1517, 1497, 1281, 1105, 960, 770.

NMR ($CDCl_3$, δ/ppm): $^1H$ (400 MHz) 8.11 (d, $^3J_{HH}$=8.4 Hz, 2H), 8.02 (d, $^3J_{HH}$=13.7 Hz, 1H), 7.62 (d, $^3J_{HH}$=13.7 Hz, 1H), 7.62 (d, $^3J_{HH}$=8.3 Hz, 2H), 3.95 (s, 3H); $^{13}C\{^1H\}$ (100 MHz) 166.1, 138.8, 137.7, 134.3, 133.2, 130.6, 129.1, 52.7 (8×s).

(1E,3E)-1-phenyl-4-nitro-1,3-butadiene (6o). A round-bottom flask was charged with (E)-cinnamaldehyde (0.25 mL, 2.0 mmol, 1.0 equiv), nitromethane (1.5 mL), and ammonium acetate (0.046 g, 0.595 mmol, 30 mol %). The mixture was refluxed (2 h) and allowed to cool. The solvent was removed by rotary evaporation. The red oily residue was dissolved in a minimum of DCM, and loaded onto a silica column that was packed and eluted with EtOAc/hexanes (15:85 v/v). The solvent was removed from the combined product containing fractions by rotary evaporation and oil-pump vacuum (rt, 14 h) to give 6o as an oily residue that slowly became a vermillion semi-solid (0.174 g, 1.00 mmol, 50%).

NMR ($CDCl_3$, δ/ppm): $^1H$ (500 MHz) 7.78 (ddd, $^3J_{HH}$=13.0, 11.6 Hz, $^4J_{HH}$=0.7 Hz, 1H), 7.55-7.47 (m, 2H), 7.44-7.37 (m, 3H), 7.24 (d, $^3J_{HH}$=13.1 Hz, 1H), 7.16 (d, $^3J_{HH}$=15.5 Hz, 1H), 6.87 (ddd, $^3J_{HH}$=15.5, 11.6 Hz, $^4J_{HH}$=0.6 Hz, 1H); $^{13}C\{^1H\}$ (100 MHz) 146.2, 139.3, 138.8, 135.3, 130.5, 129.2, 127.9, 120.7 (8×s).

Although various embodiments of the present disclosure have been illustrated in the accompanying Drawings and described in the foregoing Detailed Description, it will be understood that the present disclosure is not limited to the embodiments disclosed herein, but is capable of numerous rearrangements, modifications, and substitutions without departing from the spirit of the disclosure as set forth herein.

The term "substantially" is defined as largely but not necessarily wholly what is specified, as understood by a person of ordinary skill in the art. In any disclosed embodiment, the terms "substantially", "approximately", "generally", and "about" may be substituted with "within [a percentage] of" what is specified, where the percentage includes 0.1, 1, 5, and 10 percent.

The foregoing outlines features of several embodiments so that those skilled in the art may better understand the aspects of the disclosure. Those skilled in the art should appreciate that they may readily use the disclosure as a basis for designing or modifying other processes and structures for carrying out the same purposes and/or achieving the same advantages of the embodiments introduced herein. Those skilled in the art should also realize that such equivalent constructions do not depart from the spirit and scope of the disclosure, and that they may make various changes, substitutions, and alterations herein without departing from the spirit and scope of the disclosure. The scope of the invention should be determined only by the language of the claims that follow. The term "comprising" within the claims is intended to mean "including at least" such that the recited listing of elements in a claim are an open group. The terms "a", "an", and other singular terms are intended to include the plural forms thereof unless specifically excluded.

What is claimed is:

1. A composition comprising:

A cation, and an anion represented by $X^-$, wherein a base represented by: $N\text{-}EO_x^-$ is incorporated into the anion wherein E is either C or S and x is 2 or 3, wherein the cation and the anion form a bifunctional catalyst having the general structure of:

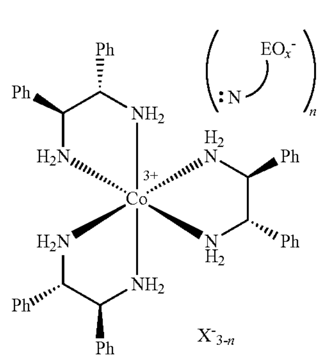

wherein n is an integer of either 1 or 2.

2. The composition of claim 1, wherein the bifunctional catalysts comprise smart or task specific counter anions that feature built in bases, and wherein the smart or task specific anions perform a specific role in a chemical reaction without the inclusion of additional external components to accomplish a same specific role in the chemical reaction.

3. The composition of claim 1, wherein a pyridyl group is incorporated into the anion.

4. The composition of claim 1, wherein bond breaking and bond making for a reaction promoted by the bifunctional catalyst is distributed over both the cation and functional groups built into the anion.

5. The composition of claim 1, wherein the anion comprises a secondary amine.

6. The composition of claim 1, wherein the bifunctional catalyst is an enantioselective catalysis.

7. The composition of claim 1, wherein the bifunctional catalyst is based upon ionic interactions and comprises functionality built into the anion.

* * * * *